(12) United States Patent
Tiberghien et al.

(10) Patent No.: US 7,309,083 B2
(45) Date of Patent: Dec. 18, 2007

(54) FEMALE CONNECTION ELEMENT AND QUICK CONNECTION INCORPORATING SUCH AN ELEMENT

(75) Inventors: Alain-Christophe Tiberghien, Sevrier (FR); Antoine Chambaud, Giez (FR)

(73) Assignee: Staubli Faverges, Faverges (FR)

( * ) Notice: Subject to any disclaimer, the term of this patent is extended or adjusted under 35 U.S.C. 154(b) by 132 days.

(21) Appl. No.: 10/983,084

(22) Filed: Nov. 8, 2004

(65) Prior Publication Data

US 2005/0121906 A1 Jun. 9, 2005

(30) Foreign Application Priority Data

Nov. 13, 2003 (FR) .................................. 03 13291

(51) Int. Cl.
*F16L 37/18* (2006.01)
(52) U.S. Cl. ...................... 285/316; 285/307; 285/317
(58) Field of Classification Search ................ 285/305, 285/307, 316, 317
See application file for complete search history.

(56) References Cited

U.S. PATENT DOCUMENTS

| | | | |
|---|---|---|---|
| 2,092,116 A | 9/1937 | Hansen | |
| 2,279,146 A * | 4/1942 | Schneller | 285/277 |
| 2,344,740 A | 3/1944 | Shaff | 285/169 |
| 2,433,119 A | 12/1947 | Hansen | |
| 3,133,755 A | 5/1964 | Sciuto | |
| 3,188,123 A | 6/1965 | Hansen | |
| 3,468,562 A | 9/1969 | Chow | |
| 4,311,328 A * | 1/1982 | Truchet | 285/308 |
| 4,350,321 A * | 9/1982 | Berg | 251/149.6 |
| 6,050,298 A | 4/2000 | Lacroix et al. | |

FOREIGN PATENT DOCUMENTS

GB 2036906 A 7/1980

* cited by examiner

*Primary Examiner*—Aaron Dunwoody
*Assistant Examiner*—Fannie C. Kee
(74) *Attorney, Agent, or Firm*—Dowell & Dowell, P.C.

(57) ABSTRACT

A female element for a quick connection for removably joining pipes of fluid under pressure and which is adapted to receive a male element. The female element includes at least one locking member movable within a guide channel that extends transverse with respect to an axis of fit of the male and female elements and which member has one end which is configured and adapted to be cooperatively engaged in a peripheral groove of the male element. The locking member is also provided with a tab which projects radially with respect to a body of the female element and which is cooperatively engaged by two portions of a control ring that is movable over the body of the female element in order to move the locking member within the guide channel between an inner locking position and an outer release position.

16 Claims, 4 Drawing Sheets

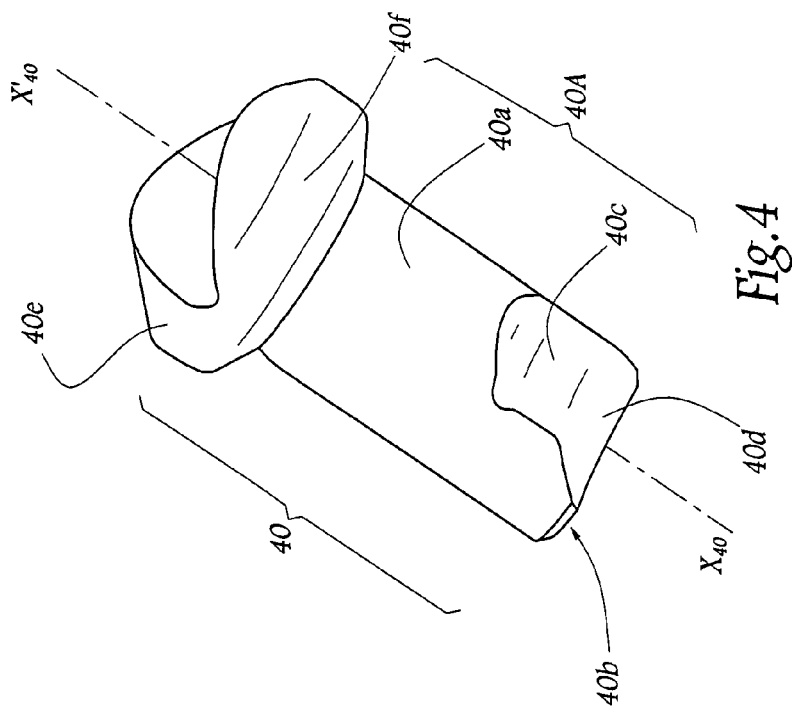
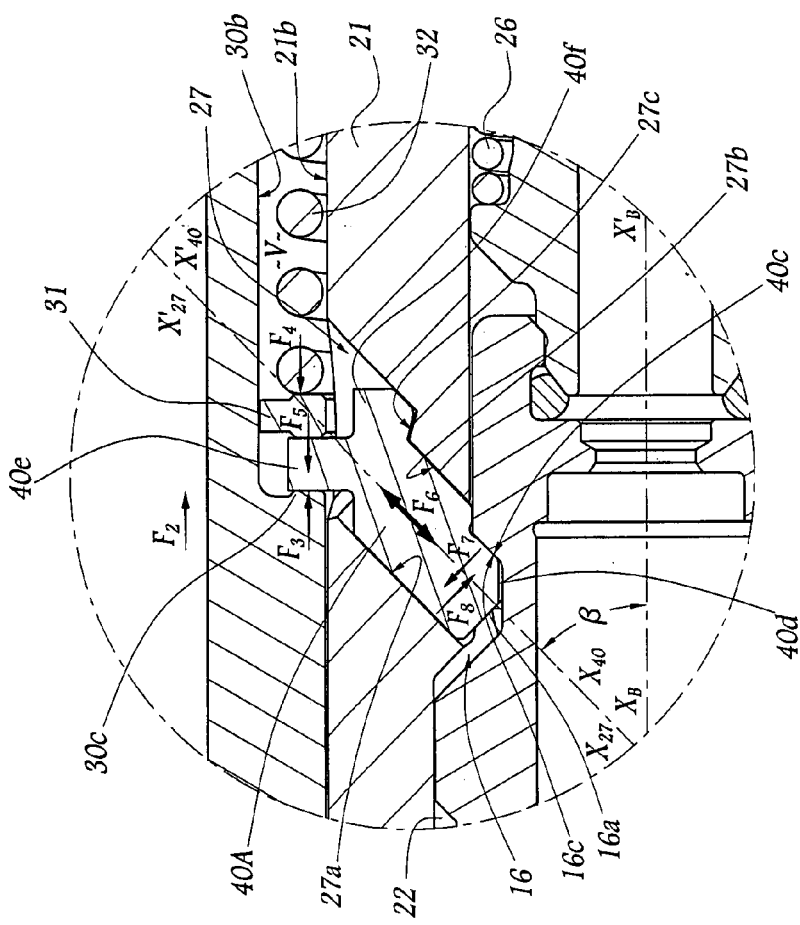
Fig. 4
Fig. 3A

FEMALE CONNECTION ELEMENT AND QUICK CONNECTION INCORPORATING SUCH AN ELEMENT

FIELD OF THE INVENTION

The invention relates to a female element of a quick connection as well as to a quick connection for an installation for handling fluid under pressure which comprises, inter alia, such a female element.

BACKGROUND OF THE INVENTION

In the domain of the removable join of pipes through which a fluid under pressure is conveyed, it is known to use a female connection element which comprises controlled means for locking a male connector in fitted configuration in the female element, i.e. when the pipes are in connected configuration. For example, it is known from U.S. Pat. No. 6,050,298 to use locking balls mounted in the female element and provided to be selectively engaged in an outer peripheral groove of a male connector.

The multiple contacts between the balls of the female element and the groove of the male connector during the successive fittings of these elements cause wear and tear and/or a localized deformation which may lead to the creation of beads or of incrustations likely to hinder correct functioning of the connection. Now, in certain applications such as the filling of automobile vehicle tanks with liquefied petroleum gas (LPG), the pressure of the fluid transiting through such a connection may be of the order of 250 bars, this involving considerable stresses on the elements constituting the connection and accelerating the phenomena of wear and tear and/or of deformation, to such a point that the life duration of such a connection may be substantially reduced.

It is known, for example from GB-A-2 036 906 or U.S. Pat. No. 3,468,562, to use wedge plates or blocks sliding in oblique directions with respect to the axis of fit of the male and female elements of a connection in order to immobilize these elements in fitted configuration. These wedge plates or blocks are of complex shape. They require sophisticated and expensive machinings. In addition, their shape induces considerable risks of jamming thereof.

Furthermore, U.S. Pat. No. 2,433,119 and U.S. Pat. No. 3,188,123 teach using cylindrical detent elements which are more economical than the afore-mentioned wedge plates or blocks. Such detents have a linear bearing surface, along a segment of their generatrix, in the groove of the male element. The radius of curvature of the detents being small, this results in high contact pressures. This bearing surface is therefore subject to rapid wear and tear and induces deformation of the male element. In order to be able to be manoeuvred, such detents must collaborate with two fast, coaxial rings of which one attacks the detents in the vicinity of their front end and the other acts in the vicinity of their rear end. This leads to an excessive radial space requirement.

It is a more particular object of the invention to overcome these drawbacks by proposing a novel female quick connection element capable of cooperating with a male element of known geometry, without inducing too much wear and tear or deformation of those parts of these elements used to lock them in fitted configuration.

SUMMARY OF THE INVENTION

In this spirit, the invention relates to a female element of a secured quick connection, intended for removably joining pipes of fluid under pressure, this element being adapted to receive a male element fitted therein along a longitudinal axis, while being equipped with means for locking this male element in fitted configuration, these means comprising at least one elongated member mobile in translation parallel to an oblique axis with respect to the axis of fit of these elements, while this member is provided with a cylindrical part of which one end is intended to be engaged in a peripheral groove of a male element fitted in the female element. This connection element is characterized in that the afore-mentioned end is defined in part by a bearing surface against a side of the groove and in that the member is provided with a tab projecting radially with respect to an outer radial surface of the body of this female element and which is engaged between two elements in relief inside of a ring controlling the position of the member, this ring being mounted around this body with the possibility of translation parallel to the axis of fit.

Thanks to the invention, the elongated locking member or finger efficiently performs its function of blocking a male connector in fitted configuration and may present a geometry avoiding high localized stresses on the male connector, hence a limitation of the wear and tear or deformation induced by the successive manipulations of the connection. The global bearing surface which is distinct from the enveloping surface of the cylindrical part, may come into surface or virtual surface contact on an edge of the groove of the female element, this limiting the wear and tear. The tab allows monitoring of the angular orientation of the cylindrical part of the elongated member about its central axis, this guaranteeing a correct orientation of the bearing surface against the edge of the afore-mentioned groove. In addition, this tab makes it possible to control, thanks to the two elements in relief of the outer ring and by the outside of the body of the female element, the displacements of the elongated member in the two directions, i.e. in the direction of the groove of the female element or opposite thereto.

According to advantageous but non-obligatory aspects, a quick connection female element may incorporate one or more of the characteristics of claims 2 to 8.

The invention also relates to a quick connection for an installation handling fluid under pressure which comprises two elements, male and female, and of which the female element is as described hereinabove.

Such a connection is more reliable and more long-lasting than those of the state of the art. It finds particularly advantageous application in the domain of filling automobile vehicle tanks, in which case the male element or connector is connected to a pipe supplying a vehicle fuel tank.

BRIEF DESCRIPTION OF THE DRAWINGS

The invention will be more readily understood and other advantages thereof will appear more clearly in light of the following description of a female element for a quick connection in accordance with its principle, given solely by way of example, and made with reference to the accompanying drawings, in which:

FIG. 3A is a view on a larger scale of detail 3A in FIG. 3;

FIG. 4 is a view in perspective and on a larger scale of a locking finger of the female element shown in FIGS. 1 to 3.

DESCRIPTION OF PREFERRED EMBODIMENT

Figure 3:
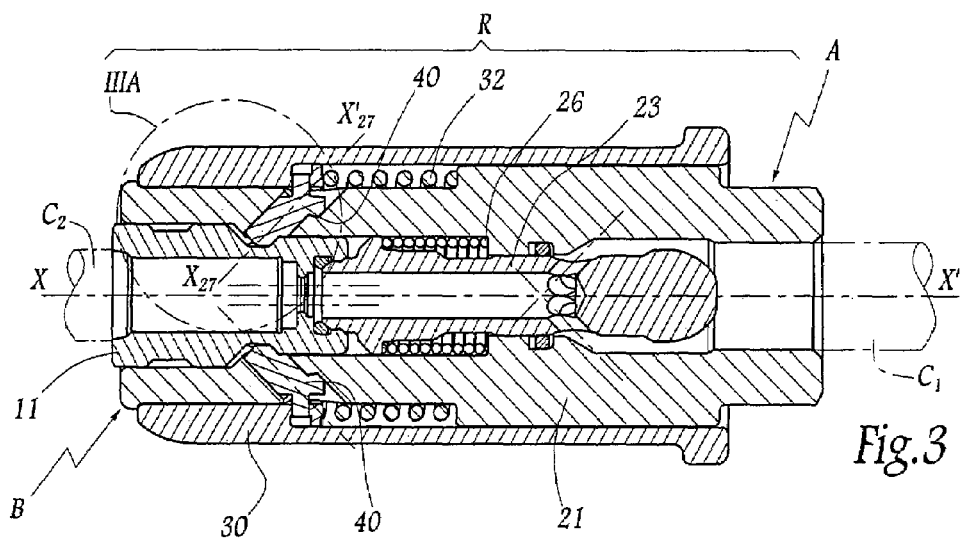
FIG. 3 is a view similar to FIG. 2 when the male and female elements are in fitted or coupled position.
Figure 2:
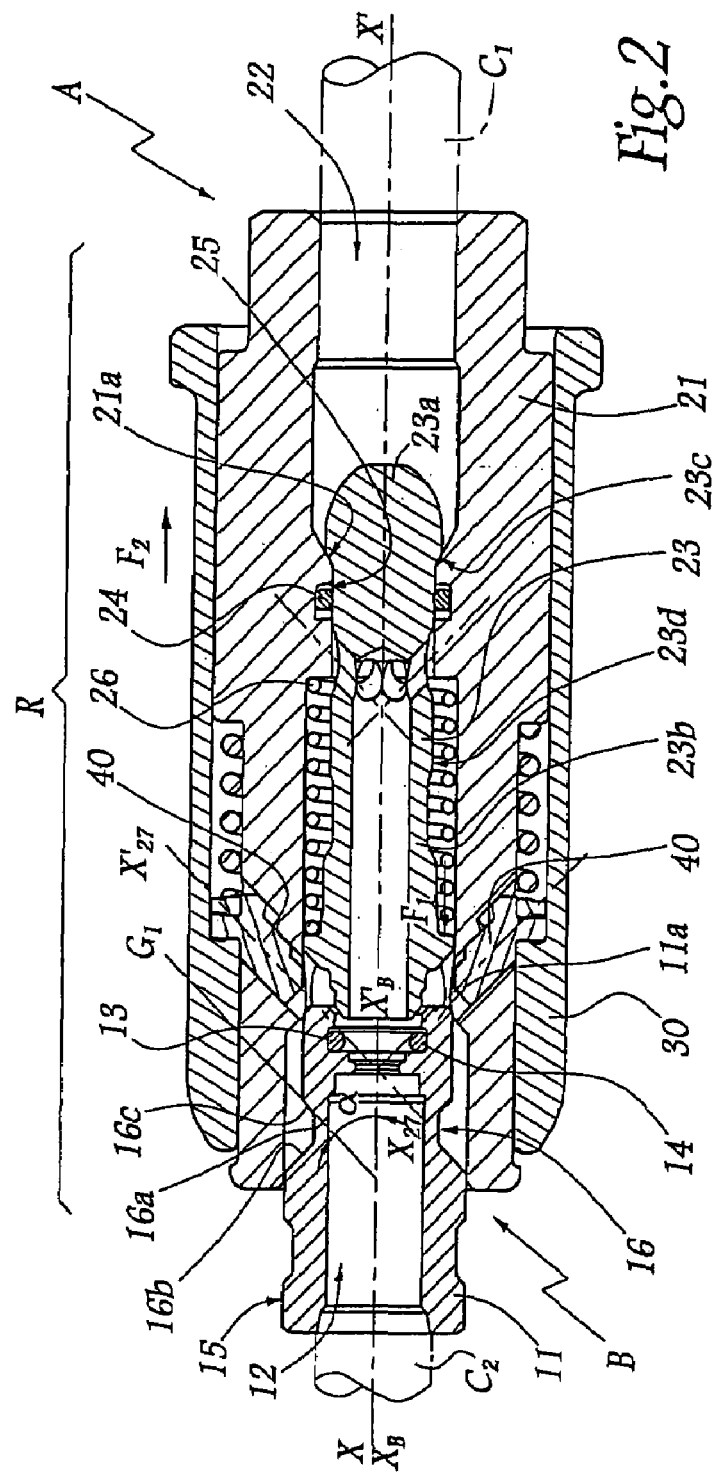
FIG. 2 is a longitudinal section of a connection according to the invention incorporating the female element of FIG. 1 during fit of the male and female elements thereof.

Referring now to the drawings, the quick connection R shown in FIGS. 2 and 3 comprises a female element A and a male element or connector B, provided to fit in each other in the direction of an axis X-X' which, in practice, is a longitudinal axis common to elements A and B.

The rear part of the female element A is fluidically connected to a first pipe $C_1$, while the rear part of the connector B is connected to a second pipe $C_2$. The connector B is mounted on an automobile vehicle and the pipe $C_2$ serves to supply the fuel tank of this vehicle (not shown), with gas under a pressure of the order of 250 bars, while the female element A is connected by the pipe $C_1$ to a source of fuel under pressure (not shown), for example LPG. In that case, the female element A may equip a service station and be intended to cooperate successively with the male connectors B mounted on different automobile vehicles.

The connector B comprises a tubular body 11 on which the pipe $C_2$ is connected, and defining an internal channel 12 for circulation of fluid. This channel may constitute a housing for a non-return valve (not shown). An O-ring 13 is mounted in an inner peripheral groove 14 of the body 11.

On its outer radial surface 15, the body 11 is provided with a peripheral groove 16 whose profile is defined by a flat bottom 16a and sides 16b and 16c diverging from the bottom 16a. In this way, the bottom 16a is cylindrical, while the sides 16b and 16c are truncated.

The connector B is symmetrical of revolution about an axis $X_B$-$X'_B$ which merges with axis X-X' when this connector is fitted in the female element A.

$G_1$ denotes the generatrix of the surface of the side 16c of the groove 16 which is closest to the end 11a of the body 11 intended to be introduced in the element A. This generatrix is rectilinear and oblique with respect to axis $X_B$-$X'_B$, with an angle of obliqueness α equal to about 45°. The surface generated by the generatrix $G_1$ is therefore a truncated surface with semi-vertex angle α.

The female element A comprises a likewise tubular body 21 on which the pipe $C_1$ is connected. This body defines a central channel 22 in which is disposed a valve 23 mobile parallel to an axis $X_A$-$X'_A$ which is a central axis of the element A merged with axis X-X' when the elements A and B are fitted.

The valve 23 is provided with a solid part 23a and with a hollow part 23b, the solid part 23a having a cylindri-conical outer surface 23c intended to come into abutment against a seat 21a formed by the body 21. An O-ring 24 is installed in an inner groove 25 of the body 21 and is intended to ensure seal with the surface 23c or with the outer radial surface 23d of the part 23b.

A spring 26 exerts on a flange 23e of the valve 23 an elastic effort $F_1$ tending to apply the part 23a against the seat 21a, i.e. to close the female element A.

A ring 30 is mounted around the body 21 and is mobile in translation with respect thereto and parallel to axis $X_A$-$X'_A$, as presented by arrows $F_2$ and $F'_2$.

Two locking fingers 40 are provided to be partially engaged in the groove 16 of the element B in the fitted configuration shown in FIG. 3.

Each elongated member or finger 40 is disposed in a housing or guide channel 27 made in the body 21, the dimensions of the housing 27 being such that the surfaces 27a and 27b defining the housing may cooperate with the outer surface 40a of a cylindrical part 40A, of straight generatrix and with circular base, of the finger 40 in order to guide this finger in translation.

The surface 27b forms a stop 27c on which a heel 40f of the finger 40 comes into abutment, this limiting the movement of the finger towards the channel 22. The finger 40 is thus captive in the housing 27.

The housing 27 opens out both at the level of the channel 22 and at the level of the volume V defined between the outer radial surface 21b of the body 21 and the inner radial surface 30b of the ring 30.

The housing 27, shown on a larger scale in FIG. 3A, extends in the direction of an axis $X_{27}$-$X'_{27}$ which is oblique with respect to axis $X_A$-$X'_A$, i.e. to axis X-X' when the male and female elements are in configuration of fit. β denotes the angle of obliqueness between axes $X_{27}$-$X'_{27}$ and $X_B$-$X'_B$. This angle is chosen to be equal to angle α.

In practice, angles α and β may have values included between 15 and 65°, preferably between 30 and 55°. Satisfactory results have been obtained with a value of α and β equal to 45°.

Axes $X_{27}$-$X'_{27}$ and $X_A$-$X'_A$ are convergent in the direction of the opening 22a of the channel 22 through which the connector B is introduced.

The finger 40 is provided with an end 40b which is intended to project into the channel 22 from the housing 27 in order to be engaged in the groove 16 and which is defined by a truncated and concave surface 40c, whose semi-vertex angle, with respect to the longitudinal axis $X_{40}$-$X'_{40}$ of the part 40A of the finger 40, is of a value equal to that of β and with radius of curvature similar to that of the surface forming the side 16c, with the result that the end 40b and the side 16c are complementary at the level of the surface 40c, this guaranteeing a surface abutment between the finger 40 and the body 11 at the interface 40c/16c.

The end 40b is also defined by a surface 40d in the form of a portion of cylinder, of circular section and of geometry complementary of that of the bottom 16a of the groove 16.

It is thus possible to obtain an abutment of the finger 40 in the groove 16 both on its bottom 16a and on its side 16c. As shown in FIGS. 3 and 3A, the end 40b may be in abutment on the edge 16c without interference of the surface 40d with the bottom 16a due to the fact that the cooperation of the stop 27c and of the heel 40f limits the centripetal displacement of the enlongated member or finger 40. Insofar as it does not come into abutment against the bottom 16a, the surface 40d may have a geometry other than that mentioned hereinabove. It may be flattened, as long as it does not hinder the surface abutment between the surface 40c and the edge 16c.

When the finger 40 is in place in the housing 27, its axis $X_{40}$-$X'_{40}$ merges with axis $X_{27}$-$X'_{27}$.

The finger 40 is also provided with a tab 40e projecting radially with respect to the surface 21b outside the housing 27 and which is engaged between a shoulder 30c made on the inner surface 30b of the ring 30 and a secondary ring 31 fast with the ring 30.

In this way, when the ring 30 is displaced towards the rear of the body 21, i.e. in the direction of the pipe $C_1$, by an effort in the direction of arrows $F_2$ in FIGS. 2 and 3A, the shoulder 30c exerts on a first surface 40e1 of the tab 40e an effort $F_3$ which has the effect of displacing the finger 40 in abutment on the surfaces 27b and 27c, this, taking into account the obliqueness of axis $X_{27}$-$X'_{27}$, inducing a both axial and radial displacement of the finger 40, parallel to its longitudinal axis $X_{40}$-$X'_{40}$, to such a point that its end 40b is extracted from the groove 16 and from the channel 22. In that case, the finger does not oppose a withdrawal of the connector B from the channel 22.

Figure 1:
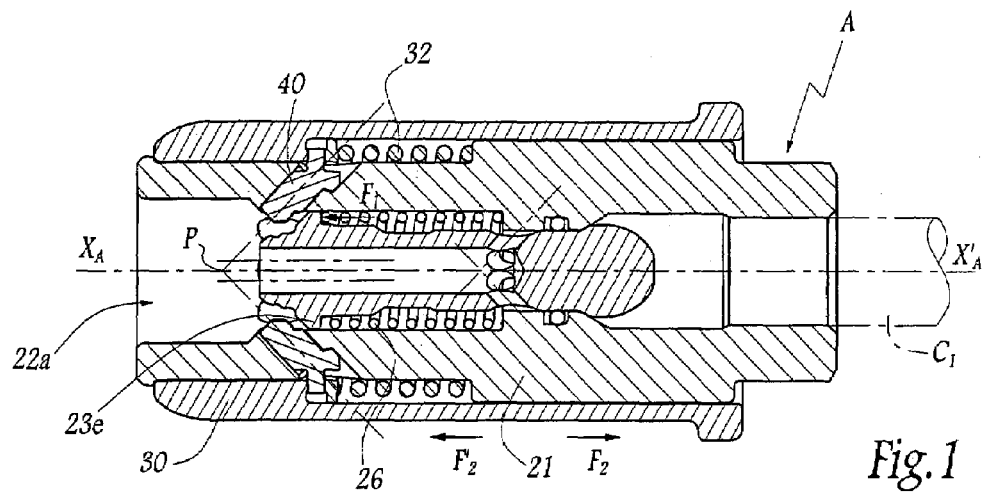
FIG. 1 schematically shows a longitudinal section of a female connection element according to the invention.

When the effort exerted on the ring 30 is released, a spring 32 installed in the volume V exerts on the ring 31 an elastic return effort $F_4$ which is transmitted, in the form of an effort $F_5$ exerted on a second surface 40e2 of the tab 40e opposite the surface 40e1, to each finger 40 which is in that case displaced in the direction opposite the previously mentioned movement in order to attain the position shown in FIGS. 1 and 3 where it projects into the channel 22.

The surfaces 40e1 and 40e2 are parallel to each other and substantially radial with respect to axis $X_A$-$X'_A$, this allowing them to receive in clear cut manner the efforts $F_3$ and $F_5$ while being able to slide between the surfaces of the shoulder 30c and the ring 31 against which they are in abutment, between the positions respectively shown in FIGS. 2 and 3, the distance between parts 30c and 31 in that case remaining substantially constant.

In the absence of effort exerted on the ring 30 by the user, the effort $F_4$ also ensures maintenance of the fingers 40 in the configuration of FIGS. 3 and 3A where they lock the connector B in fitted configuration in the body 21.

It follows from the foregoing that each finger 40 has a movement of translation represented by double arrow $F_6$, controlled solely thanks to the ring 30 and which takes place parallel to axes $X_{27}$-$X'_{27}$ and $X_{40}$-$X'_{40}$. In particular, it is not necessary to act at the level of the end 40b in order to cause the cylindrical part 40A to slide from its position of FIG. 3 to that of FIG. 2, as the finger 40 is controlled from the rear, i.e. by its side opposite end 40b.

Figure 5:
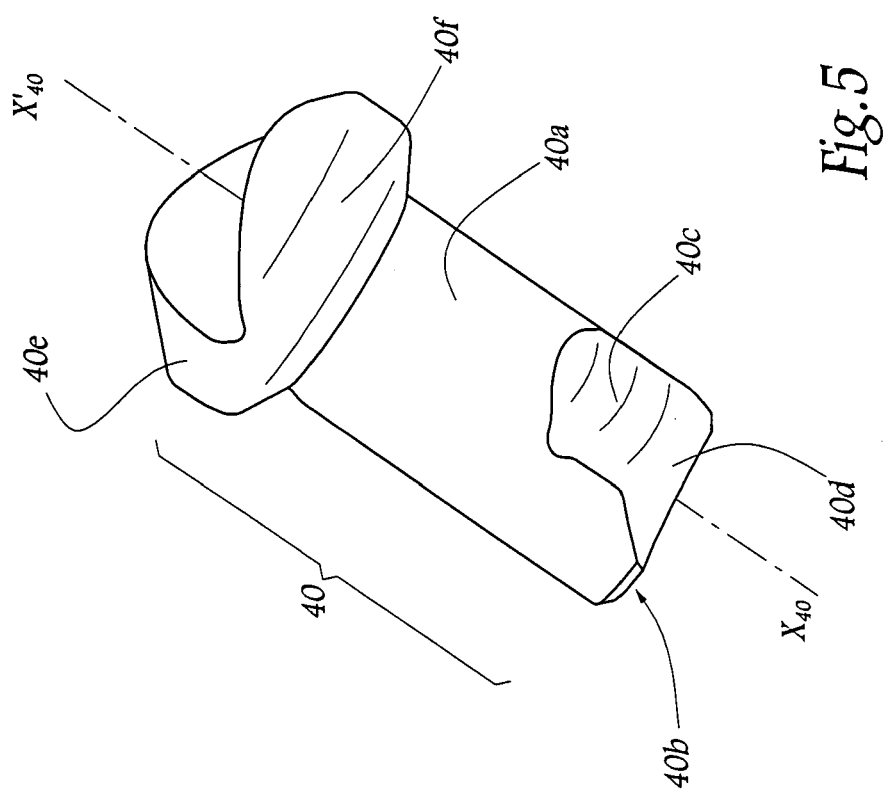
FIG. 5 is a view similar to FIG. 4 showing an alternate embodiment wherein a portion of the locking finger is convex.

The surface 40c allows a surface or virtual surface abutment against the edge 16c, which is advantageous in terms of wear and tear. Of course, the geometry of the surface 16c may be adapted as a function of the geometry of the edge 16c. It is not necessarily strictly truncated, but substantially truncated. It may equally well be substantially flattened with respect to the surface 40a, in which case the abutment of the surface 40c on the edge 16c is a virtual surface abutment insofar as the surfaces adjacent the points of contact are very close to one another. The surface 40c may also be convex, as is shown in FIG. 5, having a radius of curvature that is greater than that of the surface 40a, this avoiding deforming the side 16c by the surface 40c.

In all cases, the surface 40c is different from the envelope of the part 40A which defines the surface 40a, this allowing it to have a concavity and/or a radius of curvature different from that of this surface 40a. The part 40A may therefore be relatively fine and the housing 27 may be of small volume, but without high contact pressures being generated at the interface between the finger 40 and the body 11, i.e. between the surfaces 40c and 16c.

Taking into account this function of the surface 40c, the angular orientation of the part 40A about the axis $X_{40}$-$X'_{40}$ should be monitored in order to guarantee that the surface 40c is indeed turned in the direction of the edge 16c. This objective is attained thanks to the tab 40e which, by projecting in the volume V between the elements 30c and 31, avoids the finger rotating about this axis. In other words, the geometry of the elongated member or finger 40 at the tab 40e makes it possible to ensure the angular orientation of its cylindrical part 40A.

It is understood that, when it is desired to fit the connector B in the female element A, the effort $F_2$ may be exerted as shown in FIG. 2, this making it possible to disengage the fingers 40 from the channel 22, the effort of coupling to be exerted being, in that case, principally used for pushing the valve 23 against the pressure prevailing in the upstream part of the central channel 22.

As the rings 30 and 31 extend all around the body 21, they enable all the fingers 40 sliding in corresponding housings 27 of the body 21 to be controlled simultaneously.

It is also possible to fit the elements A and B without acting on the ring 30, the end 11a of the body 11 in that case temporarily pushing the fingers 40 towards the inside of the housings 27.

In the configuration of FIGS. 3 and 3A, each finger 40 is essentially stressed in compression between the side 16c of the groove 16 which exerts an effort $F_7$ normal with respect to the surface 40c, and the surface 27a which exerts an effort $F_8$ antagonistic to the effort $F_7$ and normal with respect to surface 40a.

These efforts $F_7$ and $F_8$ may be considerable, particularly as a function of the pressure of the fluid transiting through the connection R, without risk of deformation of the members 11, 21 and 40 since the latter are in essentially surface abutment on one another.

It should also be noted that the efforts $F_7$ and $F_8$ do not induce any effort on the ring 30 which may thus be easily manoeuvred independently of the pressure of the fluid.

The surfaces 27a, 27b and the corresponding surface 40a of the finger 40 are substantially parallel to axis $X_{27}$-$X'_{27}$. According to a variant of the invention (not shown), they may be in slight undercut.

Axes $X_{27}$-$X'_{27}$ of the housings 27 shown are secant with respect to axis $X_B$-$X'_B$ or the axis X-X' of fit at a point P. In a variant, they may be slightly offset with respect to the latter, while conserving their oblique nature.

The invention may be implemented with one sole locking finger or with more than two locking fingers, depending on the choice of the person skilled in the art. The fact of using at least two locking fingers makes it possible to distribute the effort of blocking the male connector in fitted configuration about axis X-X'.

In all cases, the female element A of the connection is adapted to a standard male element of which a large number may be mounted, for example on automobile vehicles. The invention does not necessitate modifying the male elements already used on automobile vehicles.

The invention may be used in domains other than that of filling automobile vehicle tanks, and in general in any domain where a secured connection is sought.

What is claimed is:

1. A female element for a secured quick connection for removably joining pipes of fluid under pressure, said female element being adapted to receive a male element fitted therein along a longitudinal axis thereof, said female element including a hollow body defining a central channel and a locking means for locking said male element within the central channel when the male element is inserted therein, said locking means including at least one elongated member that is movable in translation within at least one guide channel in said body that is parallel to an axis which extends at an angle with respect to the longitudinal axis of said female element, said at least one member being provided with a cylindrical part of which one end is adapted to be engaged in a peripheral groove of the male element when the male element is fitted within said female element, wherein said one end is partially defined by a bearing surface that is concave having a radius of curvature greater than a radius of said cylindrical part and that is adapted to engage a side of the peripheral groove in the male element when the male element is fitted within said female element, said at least one member having a tab projecting radially outwardly with respect to an outer radial surface of said body of said female element and which is engaged between two spaced portions of a ring for controlling positioning of said at least one member with respect to said at least one guide channel and said central channel of said body, and said ring being mounted around said body so as to be movable in translation parallel to the longitudinal axis whereby, as said ring is moved, said tab is engaged by said spaced portions of said ring to thereby adjust a position of said at least one member along said at least one guide channel.

2. The female element of claim 1, wherein said tab is provided with two oppositely oriented surfaces that are substantially radially oriented with respect to the longitudinal axis and each respectively abutting one of said spaced portions of said ring.

3. A female element for a secured quick connection for removably joining pipes of fluid under pressure, said female element being adapted to receive a male element fitted therein along a longitudinal axis thereof, said female element including a hollow body defining a central channel and a locking means for locking said male element within the central channel when the male element is inserted therein, said locking means including at least one elongated member that is movable in translation within at least one guide channel in said body that is parallel to an axis which extends at an angle with respect to the longitudinal axis of said female element, said at least one member being provided with a cylindrical part of which one end is adapted to be engaged in a peripheral groove of the male element when the male element is fitted within said female element, said one end being partially defined by a bearing surface that is adapted to engage a side of the peripheral groove in the male element when the male element is fitted within said female element, and said at least one member having a tab projecting radially outwardly with respect to an outer radial surface of said body of said female element and which is engaged between two spaced portions of a ring for controlling positioning of said at least one member with respect to said at least one guide channel and said central channel of said body, said ring being mounted around said body so as to be movable in translation parallel to the longitudinal axis whereby, as said ring is moved, said tab is engaged by said spaced portions of said ring to thereby adjust a position of said at least one member along said at least one guide channel, and said bearing surface being truncated and concave with a semi-vertex angle, with respect to a longitudinal axis of said at least one member, of a value substantially equal to that of a transverse angle of the axis parallel to which said at least one member is movable.

4. The female element of claim 3, wherein a radius of curvature of said truncated surface is adapted to be generally equal to a side of a groove of a male element when the male element is inserted within said female element.

5. The female element of claim 1, wherein said one end is also defined by a surface in the form of a portion of a cylinder with circular section and of a geometry complementary to that of a bottom of a peripheral groove of a male element adapted to be fitted in said female element.

6. The female element of claim 1, wherein said at least one member is provided with a heel for abutment on a retaining stop formed along said at least one guide channel in which said at least one member is mounted to slide and be retained captive.

7. The female element of claim 1, including resilient means for continuously urging said ring towards a position in which a force is exerted on said tab to push said at least one member towards the longitudinal axis of said body to thereby be in a position of blocking of a male element within said female element when a male element is inserted within said female element.

8. A quick connection for an installation for handling fluid under pressure comprising a male element and a female element, fixed at the ends of two portions of pipes and adapted to fit axially one within the other along a longitudinal axis of said female element, wherein said female element is in accordance with claim 1.

9. The quick connection of claim 8, wherein said male element is provided with an outer peripheral groove for receiving a part of said at least one elongated member, said groove being defined by a substantially truncated surface, and an angle between the axis parallel to which said member is movable, and the longitudinal axis of said female element, has a value substantially equal to a semi-vertex angle of said substantially truncated surface.

10. The quick connection of claim 8, wherein said male element is connected to a pipe for supplying fuel to a fuel tank of a vehicle.

11. A female element for a secured quick connection for removably joining pipes of fluid under pressure, said female element being adapted to receive a male element fitted therein along a longitudinal axis thereof, said female element including a hollow body defining a central channel and a locking means for locking said male element within the central channel when the male element is inserted therein, said locking means including at least one elongated member that is movable in translation within at least one guide channel in said body that is parallel to an axis which extends at an angle with respect to the longitudinal axis of said female element, said at least one member being provided with a cylindrical part of which one end is adapted to be engaged in a peripheral groove of the male element when the male element is fitted within said female element, wherein said one end is partially defined by a bearing surface that is convex having a radius of curvature greater than a radius of said cylindrical part and that is adapted to engage a side of the peripheral groove in the male element when the male element is fitted within said female element, said at least one member having a tab projecting radially outwardly with respect to an outer radial surface of said body Of said female element and which is engaged between two spaced portions of a ring for controlling positioning of said at least one member with respect to said at least one guide channel and said central channel of said body, and said ring being mounted around said body so as to be movable in translation parallel to the longitudinal axis whereby, as said ring is moved, said tab is engaged by said spaced portions of said ring to thereby adjust a position of said at least one member along said at least one guide channel.

12. The female element of claim 11, wherein said one end is also defined by a surface in the form of a portion of a cylinder with circular section and of a geometry complementary to that of a bottom of a peripheral groove of a male element adapted to be fitted in said female element.

13. The female element of claim 11, wherein said tab is provided with two oppositely oriented surfaces that are substantially radially oriented with respect to the longitudinal axis and each respectively abutting one of said spaced portions of said ring.

14. The female element of claim 11, wherein said at least one member is provided with a heel for abutment on a retaining stop formed along said at least one guide channel in which said at least one member is mounted to slide and be retained captive.

15. The female element of claim 11, including resilient means for continuously urging said ring towards a position in which a force is exerted on said tab to push said at least one member towards the longitudinal axis of said body to thereby be in a position of blocking of a male element within said female element when a male element is inserted within said female element.

16. A quick connection for an installation for handling fluid under pressure comprising a male element and a female element, fixed at the ends of two portions of pipes and adapted to fit axially one within the other along a longitudinal axis of said female element, wherein said female element is in accordance with claim 11.

* * * * *